United States Patent
Parker et al.

(10) Patent No.: US 7,450,368 B2
(45) Date of Patent: Nov. 11, 2008

(54) FRONT ACCESS ELECTRICAL ENCLOSURE AND ELECTRICAL BUS ASSEMBLY THEREFOR

(75) Inventors: Paul K. Parker, Wexford, PA (US); James E. Smith, Pittsburgh, PA (US); Chandrakant Z. Tailor, Greenwood, SC (US); Robert Yanniello, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 116 days.

(21) Appl. No.: 11/530,113

(22) Filed: Sep. 8, 2006

(65) Prior Publication Data

US 2008/0062619 A1    Mar. 13, 2008

(51) Int. Cl.
*H02B 1/20*      (2006.01)
*H02B 7/00*      (2006.01)
(52) U.S. Cl. .................. 361/611; 361/620; 361/600
(58) Field of Classification Search .............. 361/611, 361/605, 620, 623
See application file for complete search history.

(56) References Cited

U.S. PATENT DOCUMENTS

| | | | | | |
|---|---|---|---|---|---|
| 2,578,750 | A | * | 12/1951 | Scott, Jr. .................... | 361/608 |
| 3,562,593 | A | * | 2/1971 | Bould ........................ | 361/614 |
| 4,090,230 | A | * | 5/1978 | Fuller et al. ................. | 361/617 |
| 4,121,276 | A | * | 10/1978 | Kovatch et al. ............. | 361/614 |
| 4,305,114 | A | * | 12/1981 | Takagi et al. ................ | 361/614 |
| 4,532,574 | A | * | 7/1985 | Reiner et al. ................ | 361/660 |
| 5,483,417 | A | * | 1/1996 | Tanimizu .................... | 361/611 |
| 5,949,641 | A | * | 9/1999 | Walker et al. ............... | 361/600 |
| 6,040,976 | A | * | 3/2000 | Bruner et al. ............... | 361/611 |
| 6,205,017 | B1 | | 3/2001 | Wilkie, II et al. | |
| 6,392,141 | B1 | | 5/2002 | Smith et al. | |
| 6,512,669 | B1 | | 1/2003 | Goodwin et al. | |

OTHER PUBLICATIONS

"Magnum DS Front Accessible Switchgear", Dec. 2004, pp. 1-2, Eaton Cutler-Hammer, Moon Township, Pennsylvania.
CM52 Network Protector, Apr. 2001, pp. 1-6, Eaton Cutler-Hammer, Pittsburgh, Pennsylvania.
Distribution Switchboards, Feb. 1999, pp. 1-8, Eaton Cutler-Hammer, Pittsburgh, Pennsylvania.

* cited by examiner

*Primary Examiner*—Gregory D Thompson
(74) *Attorney, Agent, or Firm*—Martin J. Moran

(57) ABSTRACT

An electrical enclosure includes a housing having a front, a back, a plurality of sides, a plurality of sections disposed between the sides, at least one electrical apparatus, and a plurality of electrical bus members electrically connected to the electrical apparatus. The electrical apparatus is disposed within a first one of the sections of the housing, and a substantial portion of the electrical bus members are collectively disposed within a second one of the sections of the housing. At least the second one of the sections and the substantial portion of the electrical bus members collectively disposed therein are accessible from the front of the housing, regardless of whether the electrical apparatus is within or removed from the first one of the sections of the housing. An electrical bus assembly is also disclosed.

6 Claims, 6 Drawing Sheets

FRONT ACCESS ELECTRICAL ENCLOSURE AND ELECTRICAL BUS ASSEMBLY THEREFOR

CROSS-REFERENCE TO RELATED APPLICATION

This application is related to commonly assigned, concurrently filed:

U.S. patent application Ser. No. 11/530,208, filed Sep. 8, 2006, entitled "Electrical Bus Member Mounting System and Electrical Enclosure Employing the Same".

BACKGROUND OF THE INVENTION

1. Field of the Invention

The invention relates generally to electrical enclosures and, more particularly, to electrical enclosures which provide front access to electrical bus members for electrical apparatus housed within the electrical enclosures. The invention also relates to electrical bus assemblies for electrical enclosures.

2. Background Information

A significant goal with regard to power distribution systems in, for example, commercial applications, such as commercial construction applications, is to be cost effective. As such, maintenance and space considerations are driving factors in the design of new electrical equipment. Specifically, the equipment should be easy to maintain in order to minimize the amount of down time required for repair, maintenance, and/or inspection, and it should make the most efficient use possible of the available space (i.e., floor space).

Electrical apparatus, such as, for example, switchgear devices such as medium voltage (about 1,000 volts to about 100,000 volts) circuit breakers, are often housed within an electrical enclosure, such as a switchgear cabinet. Such enclosures have been known to take up substantial floor space. In fact, in some commercial applications, for example, an entirely separate room is allocated just for housing electrical equipment. It will, therefore, be appreciated that there are a number of disadvantages associated with known electrical enclosures. Among them is the fact that they are unnecessarily large in size, and suffer from an ineffective allocation of the interior space within the enclosure. Additionally, many known electrical enclosures are required to be disposed a predetermined distance from adjacent structures, such as, for example, a wall or another piece of electrical equipment. Specifically, the spacing between the electrical enclosure and adjacent structure(s) must be sufficient so as to provide access to the back side of the electrical enclosure where the electrical bus members of the electrical apparatus are typically disposed. These disadvantages contribute to the undesirable inefficient use of a significant amount of valuable floor space.

FIGS. 1A and 1B show a bottom plan view and a side elevational view, respectively, of an example switchgear cabinet 2 having a front 4, a back 6, and first and second sidewalls 8,10. The electrical apparatus 12 that are housed by the switchgear cabinet 2, such as the circuit breakers 14 which are shown, are disposed toward the front 4 of the cabinet 2. The width 11 between first and second sidewalls 8,10 of the example cabinet 2 of FIG. 1A is about 36 inches. Many electrical components such as, for example and without limitation, power cables 16, terminal connections 18 (e.g., without limitation, customer connections), surge arrestors (ARR) 20, main electrical bus 22, and ground busses 24, shown in FIG. 1B, are disposed behind the circuit breakers 14 and are arranged throughout the available space behind the circuit breakers 14 toward the back 6 of the cabinet 2. Thus, these components 16,18,20 and electrical bus members 22,24, many of which require routine inspection, are generally inaccessible except for access provided through the back 6 of the cabinet 2, as previously discussed. Specifically, in order to provide such back access, for example, to enable connection of customer power cables or for inspection, the back 6 of cabinet 2 is required to be spaced a significant distance 25 from other structures such as, for example, the wall 26 shown in FIG. 1A. In the example of FIG. 1A, the distance 25 between the back 6 of the cabinet 2 and wall 26 is about 36 inches. The cabinet 2 also has a depth 28 from front 4 to back 6 of about 96 inches. Accordingly, a significant amount of valuable floor space is undesirably occupied by the cabinet 2, as previously discussed.

Accordingly, the foregoing cabinet configuration disadvantageously requires the cabinet 2 to either be permanently disposed at a location which is sufficiently spaced from adjacent structures (e.g., without limitation, a wall; an adjacent piece of equipment), or to be periodically moved away from the adjacent structure(s) in order to provide access to the back of the cabinet. It is, therefore, desirable to provide an electrical enclosure which allows for adequate inspection of the electrical bus members for electrical apparatus housed within the enclosure, and which can also be permanently disposed adjacent other structures, if desired. It is also desirable to provide an electrical enclosure which is as small as possible, in order to minimize the amount of valuable floor space required for the enclosure.

In an attempt to provide the necessary access to the internal electrical bus members, while permitting the electrical enclosure to be disposed adjacent the wall or other structure, one prior proposal involves the use of one or more side entry removable access panels. However, the access provided by such panels is limited, particularly where a plurality of electrical apparatus (e.g., without limitation, circuit breakers) are mounted laterally adjacent one another within the electrical enclosure. Under such conditions, removable access panels do not provide access to some or all of the electrical bus members and/or to the adjacent circuit breakers which are disposed distal from the access panels, without having to first remove at least some of the electrical bus members which are closest to the access panel.

Other prior proposals have involved the implementation of separate removable or draw-out instrument compartments within the electrical enclosure, or an elaborate telescoping access panel or door to provide limited access through the front of the enclosure. However, removable or draw-out compartment designs are complex and costly, requiring a complicated electrical connector assembly to permit the instrument compartment to be moved into and out of electrical communication with electrical bus members which are permanently disposed within the enclosure. Telescoping or otherwise complicated access panels or doors are also complex and costly, and they disadvantageously take up valuable space within the electrical enclosure which could be more efficiently used in order to reduce the overall size of the enclosure.

There is a need, therefore, for an electrical enclosure which requires minimal floor space while providing sufficient access for the repair, maintenance, and inspection of the electrical bus members for electrical apparatus housed within the enclosure.

There is, therefore, room for improvement in electrical enclosures. There is also room for improvement in electrical bus assemblies for electrical enclosures.

SUMMARY OF THE INVENTION

These needs and others are met by embodiments of the invention, which are directed to an electrical enclosure and an electrical bus assembly. The electrical enclosure is for housing electrical apparatus, such as circuit breakers, while providing unobstructed front access to the electrical bus members of the circuit breaker(s), without requiring removal of the circuit breaker(s) or movement of the entire electrical enclosure. The electrical bus assembly is structured to collectively dispose a substantial portion of the electrical bus members in a section of the electrical enclosure which is readily accessible from the front of the enclosure.

As one aspect of the invention, an electrical enclosure comprises: a housing having a front, a back, a plurality of sides, and a plurality of sections disposed between the sides; at least one electrical apparatus disposed within a first one of the sections of the housing; a plurality of electrical bus members electrically connected to the at least one electrical apparatus, a substantial portion of the electrical bus members being collectively disposed within a second one of the sections of the housing; and at least one current transformer assembly electrically connected to a number of said electrical bus members with the second one of the sections of the housing, wherein at least the second one of the sections of the housing and the current transformer assembly and the substantial portion of the electrical bus members being collectively disposed within the second one of the sections are accessible from the front of the housing, regardless of whether the at least one electrical apparatus is within or removed from the first one of the sections of the housing.

The sides of the housing may comprise a top, a bottom, and opposing first and second sidewalls. The at least one electrical apparatus may comprise a single switchgear apparatus, wherein the sections of the housing comprise a first section and a second section, wherein the single switchgear apparatus is disposed within the first section, and wherein at least the substantial portion of the electrical bus members is disposed within the second section. The first section and the single switchgear apparatus disposed within the first section may be disposed between the opposing first and second sidewalls of the housing and between the top and the bottom of the housing, and the second section and the substantial portion of the electrical bus members within the second section may be disposed between one of the top of the housing and the first section, and the bottom of the housing and the first section. In the foregoing embodiment, the housing may have a depth comprising the space between the front and the back of the housing, which is about 60 inches.

The sections of the housing may comprise a first section, a second section, and at least a third section, wherein the third section is also accessible from the front of the housing. The at least one electrical apparatus may comprise at least a first switchgear device and a second switchgear device, the at least one current transformer assembly may comprise first and second current transformer assemblies, and the substantial portion of the electrical bus members may include at least a first portion of the electrical bus members being electrically connected to the first switchgear device and a second portion of the electrical bus members being electrically connected to the second switchgear device, wherein the first switchgear device is disposed within the first section of the housing, wherein the second switchgear device is disposed within the second section of the housing, and wherein the first and second current transformer assemblies and the first and second portions of the electrical bus members are disposed within the third section of the housing. The first section of the housing and the first switchgear device disposed within the first section may be disposed at or about one of the opposing first and second sidewalls of the housing and between the top and the bottom of the housing. The second section of the housing and the second switchgear device disposed within the second section may be disposed at or about the one of the opposing first and second sidewalls of the housing and between one of the first section and the top of the housing, and the first section and the bottom of the housing. The third section and the first and second portions of the electrical bus members disposed within the third section may be disposed between the other one of the first and second opposing sidewalls of the housing and both the first section and the second section of the housing. In the foregoing embodiment, the housing may have a width comprising the space between the opposing first and second sidewalls of the housing, wherein the width is about 45 inches.

As another aspect of the invention, an electrical bus assembly is provided for an electrical apparatus housed by an electrical enclosure. The electrical enclosure comprises a housing having a front, a back, a plurality of sides, and a plurality of sections disposed between the sides. The electrical apparatus is disposed within a first one of the sections of the housing. The electrical bus assembly comprises: a plurality of electrical bus members structured to be electrically connected to the electrical apparatus; and at least one current transformer assembly electrically connected to a number of the electrical bus members, wherein such current transformer assembly and a substantial portion of the electrical bus members are structured to be collectively disposed within a second one of the sections of the housing, and wherein at least the second one of the sections of the housing and such current transformer assembly and the substantial portion of the electrical bus members disposed within the second one of the sections are accessible from the front of the housing, regardless of whether the electrical apparatus is within or removed from the first one of the sections of the housing.

The electrical bus members may comprise a primary power bus and a plurality of secondary electrical bus members electrically connected to the primary power bus, wherein the primary power bus is structured to be electrically connected to the electrical apparatus, and wherein the substantial portion of the electrical bus members disposed within the second one of the sections of the housing comprises substantially all of the secondary electrical bus members, in order that substantially all of tire secondary bus members are disposed within the second one of the sections of the electrical enclosure housing, thereby being accessible from the front of the electrical enclosure. A number of the electrical bus members may be subject to periodic inspections when disposed within the housing of the electrical enclosure, and the substantial portion of the electrical bus members may comprise substantially all of the electrical bus members which are subject to the periodic inspections.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1A:
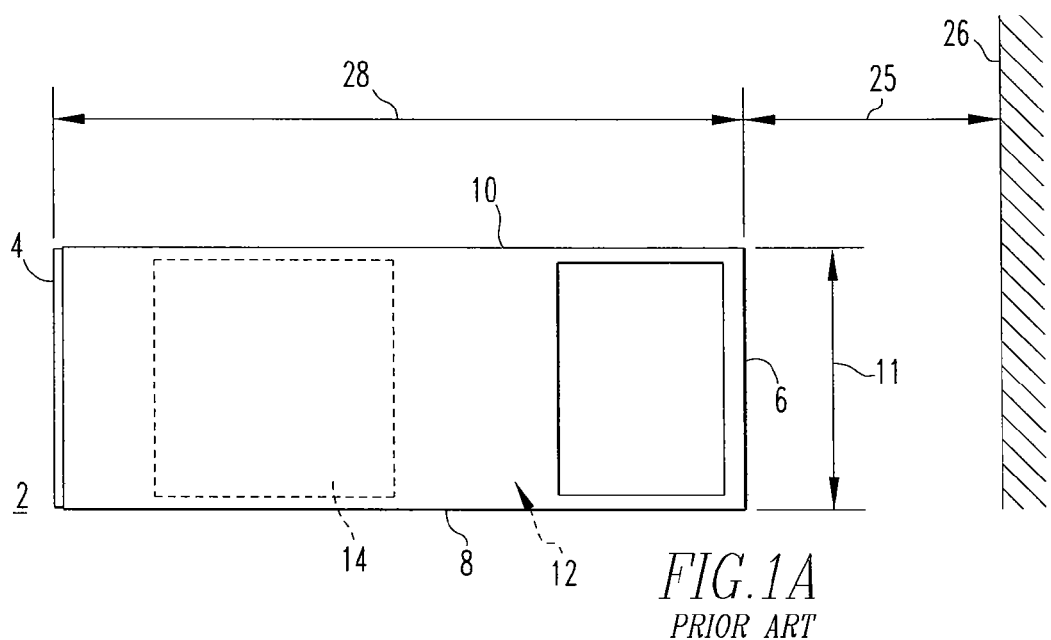
FIGS. 1A and 1B are bottom plan and side elevation views, respectively, of a prior art switchgear cabinet.

For purposes of illustration, embodiments of the invention will be described as applied to switchgear cabinets housing one or more switchgear devices, such as circuit breakers, although it will become apparent that it could also be applied to provide unobstructed front access to a wide range of electrical bus members for any known or suitable electrical apparatus disposed within an electrical enclosure.

Directional phrases used herein, such as, for example, left, right, front, back, top, bottom and derivatives thereof, relate to the orientation of the elements shown in the drawings and are not limiting upon the claims unless expressly recited therein.

As employed herein, the term "section" refers to an interior portion, defined area, compartment, portion of a compartment, or particular region within an electrical enclosure.

As employed herein, a "switchgear apparatus" expressly includes, without limitation, any known or suitable switchgear device which is structured to provide protection from electrical fault conditions such as, for example and without limitation, current overloads, short circuits and abnormal voltage conditions.

As employed herein, the term "switchgear device" means a circuit interrupter, such as a circuit breaker (e.g., without limitation, low-voltage or medium-voltage or high-voltage); a motor controller/starter; a contactor; a network protector; and/or any suitable device which carries or transfers voltage, current or power from one place to another.

As employed herein, the term "electrical bus" or "electrical bus member" means a power conductor; a power conductor structured to receive a surge protection device (e.g., without limitation, a surge arrestor (ARR)); a power conductor structured to receive a current transformer (CT); a power conductor structured to receive a current or voltage sensing device; a conductor which carries or transfers voltage, current or power; a ground conductor; a power bus bar; a bus bar connection point; a finger cluster; and/or a terminal connection.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
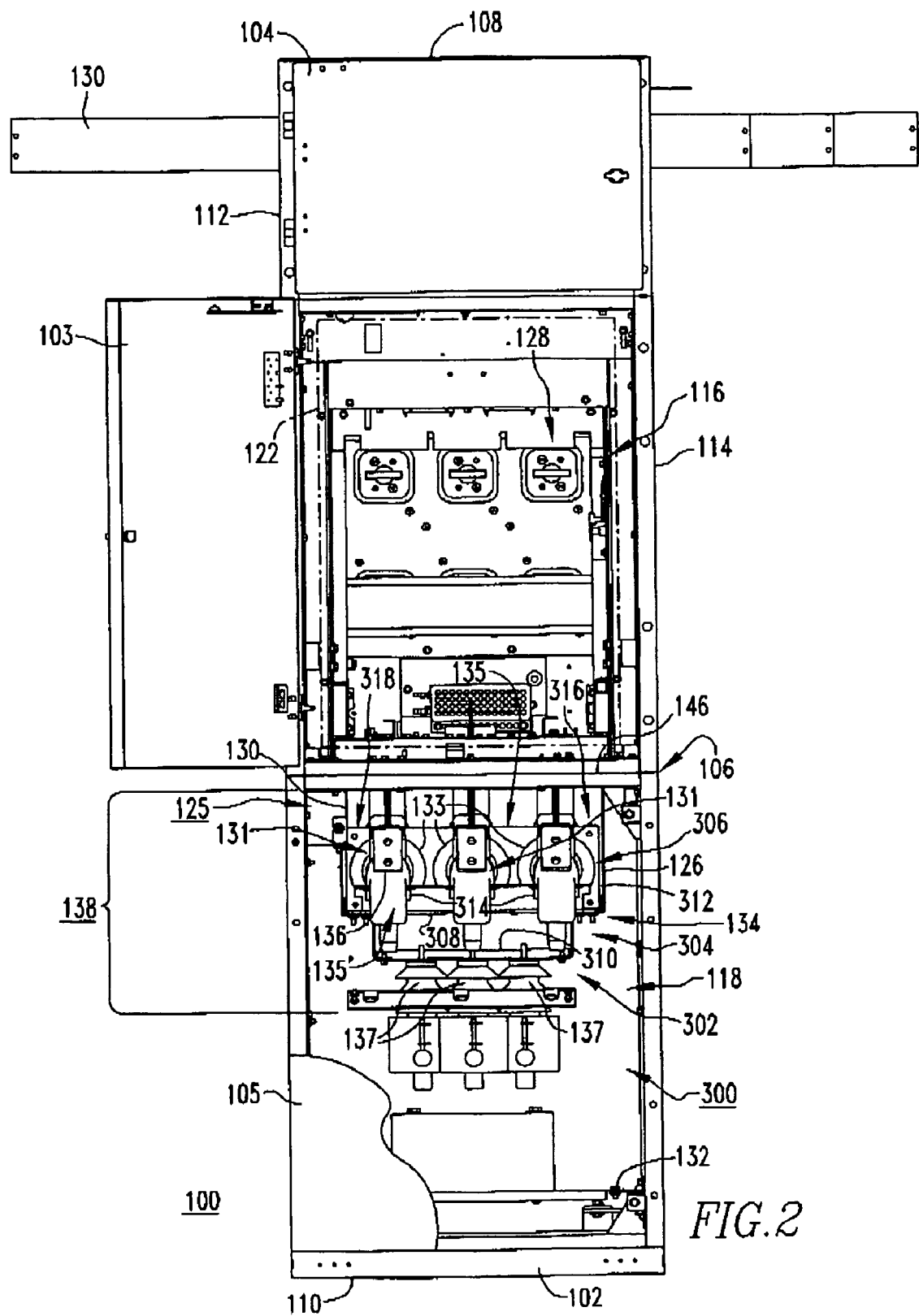
FIG. 2 is a front elevation view of a front access switchgear cabinet for housing a single circuit breaker, and an electrical bus assembly therefore, in accordance with an embodiment of the invention.
Figure 3:
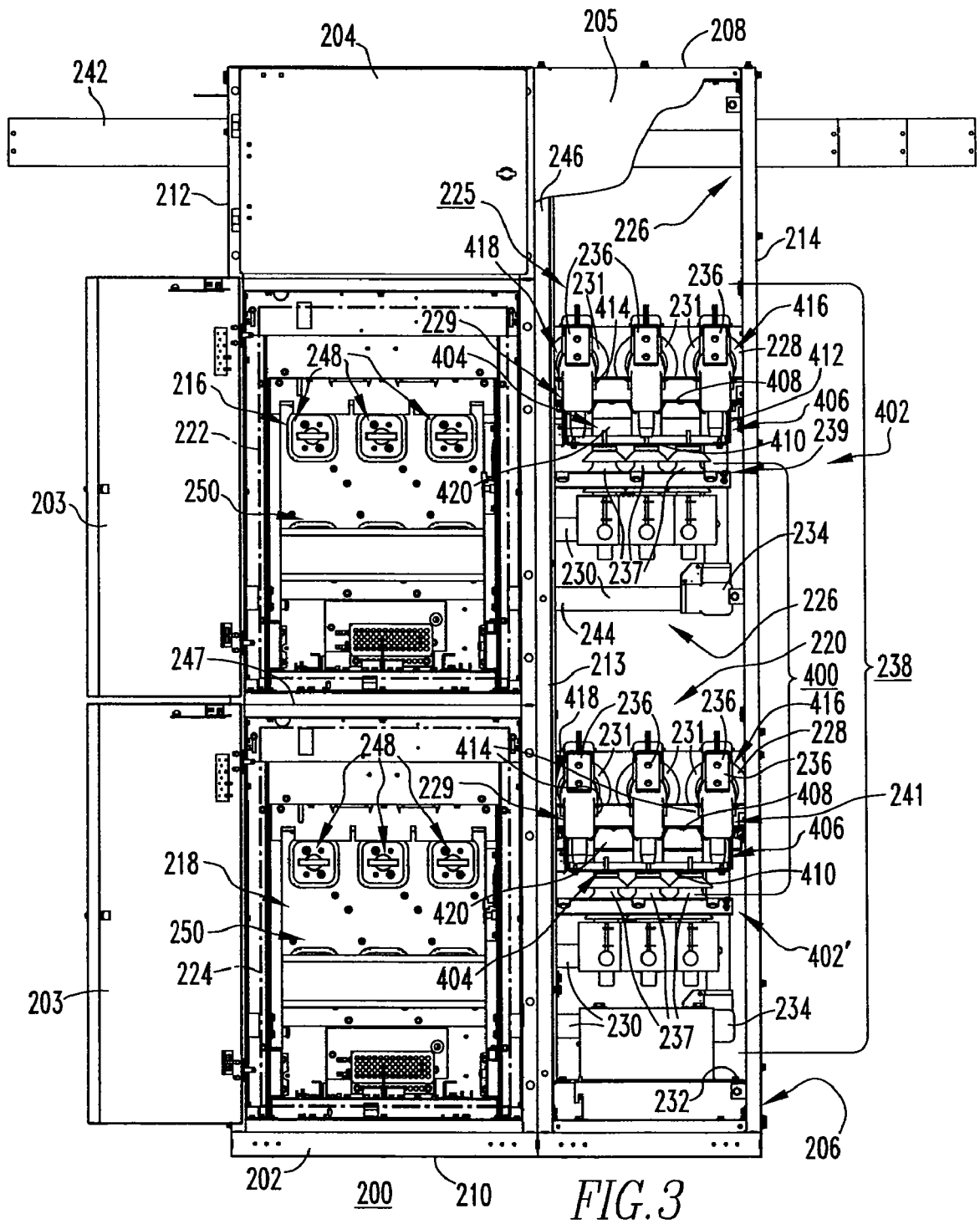
FIG. 3 is a front elevation view of a front access switchgear cabinet for housing a pair of circuit breakers, and an electrical bus assembly, in accordance with another embodiment of the invention.
Figure 4:
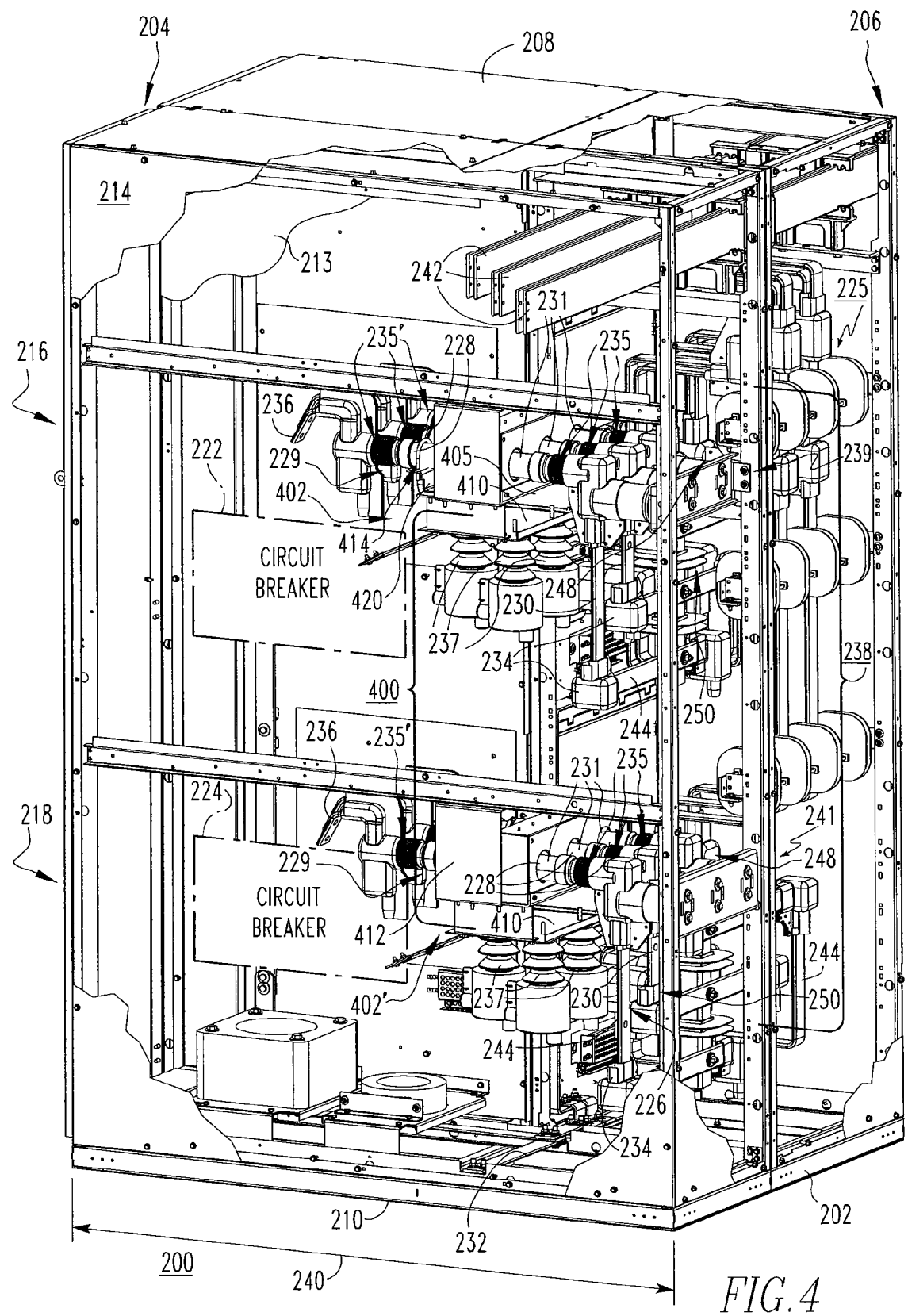
FIG. 4 is an isometric view of the front access switchgear cabinet, and electrical bus assembly of FIG. 3 with portions of the side and back of the switchgear cabinet cut-away to show internal structures.

FIG. 2, and FIGS. 3 and 4, respectively, show two electrical enclosures 100,200 which provide substantially unobstructed access to the electrical bus assembly 125,225 of the enclosure 100,200 through the front 104,204 thereof, in accordance with two non-limiting example embodiments of the invention. In referring to the FIGS., it will be appreciated that like components are numbered similarly. For example, the various components of the electrical enclosure embodiment shown and described with respect to FIG. 2 below are numbered with 100 series reference numbers, whereas the embodiment of FIGS. 3 and 4 is numbered similarly but with 200 series reference numbers. For simplicity of disclosure, similar features present in more than one embodiment are shown, but may not be repetitively discussed. Likewise, for simplicity of disclosure, similar features which are present and are substantially the same in both the embodiment of FIG. 2 and the embodiment of FIGS. 3 and 4, such as the depth of the electrical enclosure, may only be shown and described with respect to one of the embodiments. In such instances, it will be understood that such features are substantially the same in the other example embodiment which is shown. It will also be appreciated that the concepts of the invention are applicable to other electrical enclosure embodiments which are not expressly shown herein.

The electrical enclosure of FIG. 2 is a switchgear cabinet 100 including a housing 102 with a front 104, a back 106, and a plurality of sides 108,110,112,114. The sides include a top 108, a bottom 110, and first and second sidewalls 112,114. A plurality of sections 116,118 are disposed between the sides 108,110,112,114, with at least one electrical apparatus, such as the circuit breaker 122, shown in phantom line drawing in simplified form, being disposed within a first one (e.g., first section 116 in FIG. 2) of the sections 116,118. An electrical bus assembly 125 including a plurality of electrical bus members 126,128,130,132,134,136 (see also bus members 226, 228,230,232,234,236, best shown in FIG. 4, which are, respectively, substantially similar) are electrically connected to the circuit breaker 122.

As will be described in greater detail below with respect to electrical bus assembly 225 of FIGS. 4 and 5, a substantial portion 138 of the electrical bus members 126,128,130,132, 134,136 is collectively disposed within a second one (e.g., second section 118 of FIG. 2) of the sections 116,118 of housing 102. Accordingly, at least the second section 118 of the housing 102 and the substantial portion 138 of the electrical bus members 126,128,130,132,134,136, which are collectively disposed therein, are accessible from the front 104 of the housing 102. This is true regardless of whether the circuit breaker 122 (shown in simplified form in phantom line drawing in FIG. 2) is within (shown) or removed from (not shown) the first section 116 of the housing 102. A door, such as hinged door 103, a removable panel 105 (partially shown in FIG. 2), or any other known or suitable cover can be employed to cover the various sections 116,118 of the housing 102.

In the example of FIG. 2, the substantial portion 138 of the electrical bus members 126,128,130,132,134,136 of electrical bus assembly 125 is disposed within second section 118, which is generally laterally adjacent first section 116. First section 116 and circuit breaker 122 disposed therein are disposed between the opposing first and second sidewalls 112, 114 of the housing 102, as well as between the top 108 and the bottom 110 of the housing 102. Hence, the second section 118 and the substantial portion 138 of the electrical bus members 126,128,130,132,134,136 disposed therein, are disposed between the first section 116 and one of the top 108 or the bottom 110 of the switchgear cabinet housing 102. The example first section 116 is disposed generally towards the top 108 of housing 102 with second section 118 and substantial portion 138 of the electrical bus members 126,128,130, 132,134,136 disposed therein being laterally adjacent the first section 116 beneath (from the prospective of FIG. 2) the first section 116 towards the bottom 110 of the housing 102. It will, however, be appreciated that any known or suitable alternative configuration of the first and second sections 116, 118 and the components (e.g., circuit breaker 122; electrical bus members 126,128,130,132,134,136) could be disposed in any suitable alternative configuration without departing from the scope of the invention. For example and without limitation, in one alternative configuration which is not shown, the first section 116 could be disposed towards the bottom 110 (from the prospective of FIG. 2) of housing 102, with second section 118 being disposed on top (from this prospective of FIG. 2) of the first section 116.

Figure 1B:
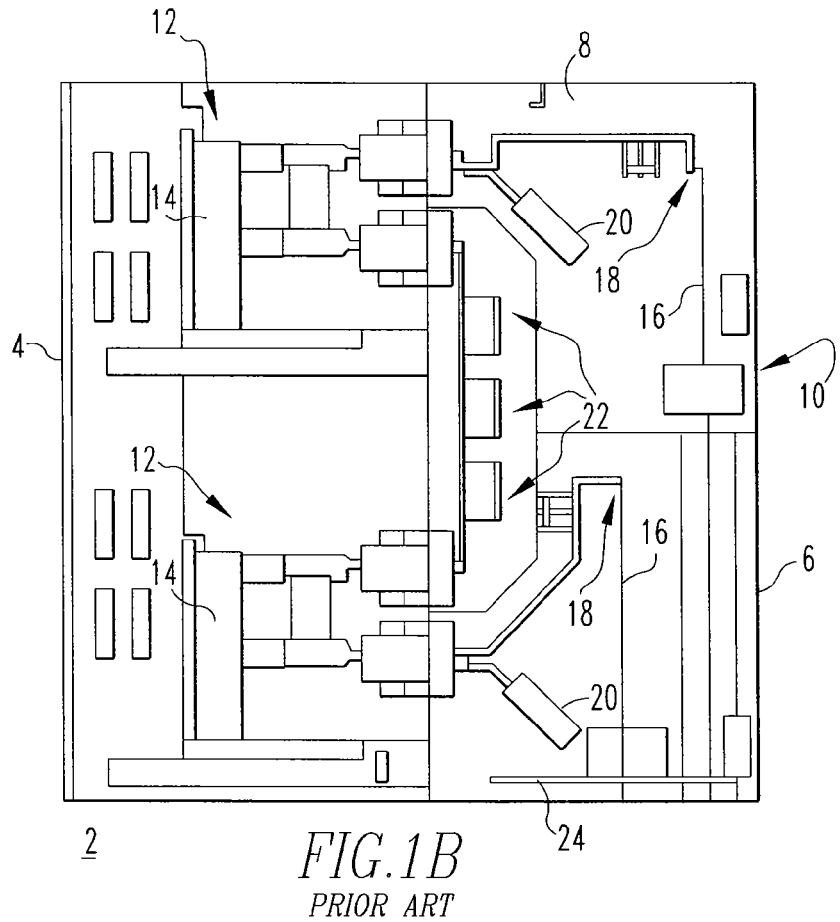

The disclosed electrical bus assembly 125 and electrical enclosure design reduce the overall size of the switchgear cabinet 100 with respect to known prior art designs (e.g., without limitation, cabinet 2 of FIGS. 1A and 1B), while still allowing for unobstructed front access to the substantial portion 138 of the electrical bus assembly 125. More specifically, the housing 102 of the switchgear cabinet 100 has an example width between the opposing first and second side walls 112, 114 of the housing 102 of about 26 inches. It will, however, be appreciated that the housing 102 could have a width which is less than or greater than 26 inches, depending on the particular type and configuration of electrical apparatus (e.g., without limitation, circuit breaker 122) disposed within the housing 102. For example, the width between opposing first and second sidewalls 212,214 of housing 202 of the example switchgear cabinet 200 of FIGS. 3 and 4 is greater than the width of housing 102, because as will be discussed, it houses two circuit breakers 222,224, not one. Specifically, in the example of FIGS. 3 and 4, the width of the housing 202 is about 45 inches. As will be discussed with respect to FIG. 4, the electrical enclosure (e.g., switchgear cabinet 200) also has a depth 240 which is significantly less than the depth of known electrical enclosures (e.g., cabinet 2 of FIGS. 1A and 1B).

In the example of FIGS. 3 and 4, the housing 202 of the switch gear cabinet 200 includes three sections, a first section 216, a second section 218, and a third section 220, although it will be appreciated that embodiments having more than three sections (not shown) are also contemplated by the invention. The first circuit breaker 222 (shown in phantom line drawing in simplified form) is disposed within the first section 216, and the second circuit breaker 224 (shown in phantom line drawing in simplified form) is disposed within the second section 218. The third section 220 is accessible from the front 204 of the switchgear cabinet housing 202, and houses the substantial portion 238 of the electrical bus members 226, 228,230,232,234,236 (best shown in FIG. 4).

Figure 5:
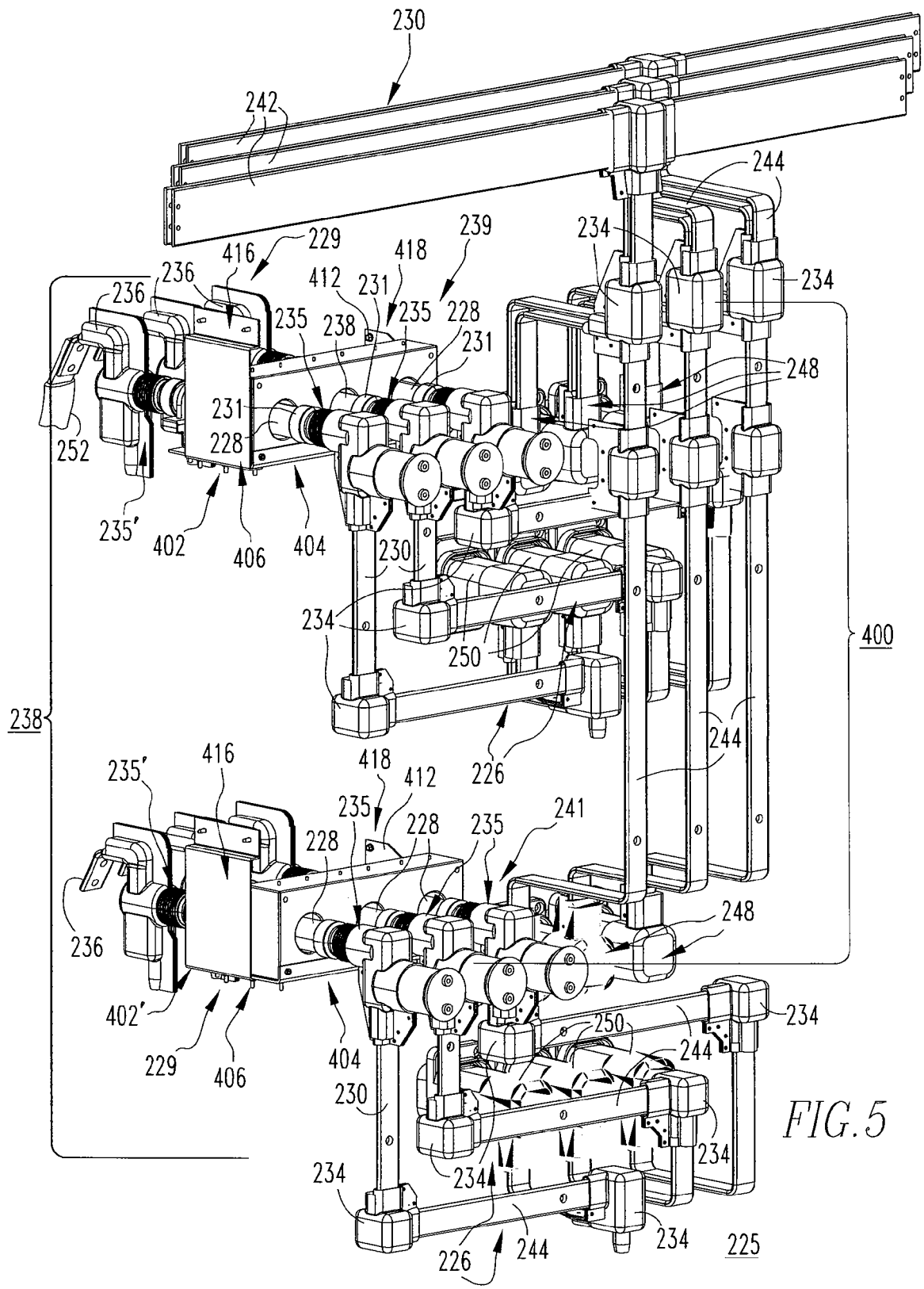
FIG. 5 is an isometric view of the electrical bus assembly of FIG. 4, showing an electrical bus member mounting system.

More specifically, as best shown in FIGS. 4 and 5, the substantial portion 238 of the electrical bus members 226, 228,230,232,234,236 includes a first portion 239 being electrically connected to first circuit breaker 222 (FIG. 4, shown in simplified form in phantom line drawing) and a second portion 241 electrically connected to second circuit breaker 224 (FIG. 4, shown in simplified form in phantom line drawing). The example electrical bus assembly 225 includes a primary power bus 242, and a plurality of secondary electrical bus members 244 which are electrically connected to the primary power bus 242. The primary power bus 242 is electrically connected to the first and second circuit breakers 222,224 and the substantial portion 238 of the electrical bus members 226,228,230,232,234,236, which comprise substantially all of the secondary electrical bus members 244 that are disposed in the section (e.g., third section 220) of the switchgear cabinet housing 202 which is accessible from the front 204 of the housing 202. In the example shown and described herein with respect to FIGS. 3 and 4, this section (e.g., third section 220) of the housing 202 extends from the front 204 of the housing 202 to the back 206 of the housing 202, although it will be appreciated that this need not necessarily be the case.

As previously noted, the electrical bus members 226,228, 230,232,234,236 of the electrical bus assembly 225 are preferably subject to the requirement of being periodically inspected. Thus, like substantial portion 138 of electrical bus assembly 125 previously discussed, the substantial portion 238 of the electrical bus members 226,228,230,232,234,236 comprises substantially all of the electrical bus members 226,228,230,232,234,236 which are subject to such inspections, and are collectively disposed within the third section 220 of the switch gear cabinet housing 202. Therefore, it will be appreciated that the electrical bus assemblies 125,225 are substantially similar except that electrical bus assembly 225 (best shown in FIG. 5) further includes a second set of electrical bus members 226,228,230,232,234,236 which are electrically connected to the second circuit breaker 224. In this manner, substantially unobstructed access is provided to the substantial portion 238 in order to facilitate inspection and maintenance thereof. This advantageously enables the switchgear cabinet 200 to be permanently disposed with the back 206 and sidewalls 212,214 of the cabinet housing 202 in very close proximity (e.g., without limitation, within about 2 to about 3 inches, or less) of adjacent structures, such as, for example, a building wall (not shown) or another piece of adjacent equipment (not shown). This is because, unlike known prior art electrical enclosure designs (see, for example, cabinet 2 of FIGS. 1A and 1B), access to substantially all of the electrical bus members (e.g., 226,228,230, 232,234,236) of the example electrical enclosure 200 is available through the front 204 of the enclosure housing 202. Accordingly, it is not necessary to provide substantial space behind the enclosure 200 and between the enclosure 200 and adjacent structures (e.g., a building wall; an additional piece of electrical equipment) (not shown).

In FIGS. 3 and 4, the first section 216 of the housing 202 of switchgear cabinet 200 is disposed at or about the first sidewall 212 of the housing 202 and between the top 208 and the bottom 210 of the housing 202. The second section 218, which houses circuit breaker 224, is disposed at or about the same sidewall 212, under (from the prospective of FIGS. 3 and 4) the first section 216 between the first section 216 and the bottom 210 of the housing 202. The third section 220 and portions 239,241 of the electrical bus members 226,228,230, 232,234,236 substantially collectively disposed therein, are disposed between the other one of the sidewalls (second sidewall 214) of the housing 202 and both of the first and second sections 216,218 of the housing 202, as shown. Within the third section 220, the first portion 239 of the electrical bus members 226,228,230,232,234,236, which comprises the substantial portion 239 of the electrical bus members 226, 228,230,232,234,236 which are electrically connected to the first circuit breaker 222, is generally disposed laterally adjacent the first section 216 and first circuit breaker 222. Similarly, the second portion 241 of the electrical bus members 226,228,230,232,234,236, which comprise the substantial portion 241 of the electrical bus members 226,228,230,232, 234,236 which are electrically connected to the second circuit breaker 224 and subject to inspection, are generally disposed laterally adjacent the second section 218 and the second circuit breaker 224 disposed therein. Each of the substantial portions 239,241 of the electrical bus assembly 225 includes, for example and without limitation, a power conductor 226, a conductor which carriers or transfers voltage, current or power, such as the conductors 228 coupled to the CT bushings 231, shown, a power bus bar 230, including secondary electrical bus members 244, shown, a ground conductor 232, a bus bar connection point 234, and a terminal connection 236. As will be discussed in further detail hereinbelow with respect to FIGS. 6A and 6B, the substantial portions 239,241 of electrical bus assembly 225 are mechanically coupled and electrically connected to an electrical bus member mounting system 400 (see also substantial portion 138 of electrical bus assembly 125 mechanically coupled and electrically connected to electrical bus member mounting system 300 of FIG. 2) in order to facilitate consolidation of the substantial portions 239,241 at a single location (e.g., section), readily available within said enclosure housing 202.

Referring to FIGS. 3-5, the current path to and from the circuit breakers 222,224 (FIGS. 3 and 4) will now be discussed. For simplicity of disclosure, the current path will only be discussed with respect to first circuit breaker 222 (FIGS. 3 and 4). It will be appreciated that the current path for second circuit breaker 224 (FIGS. 3 and 4) is substantially similar. Specifically, current is received by circuit breaker 222 (FIGS. 3 and 4) at line conductors 248 (best shown in FIG. 3) which electrically connect to corresponding circuit breaker line conductors (not shown) in a well known manner. As best understood with reference to electrical bus assembly 225 of FIG. 5, power is provided to the line conductors 248 via primary power bus 242 and secondary bus members 244 which include, for example, power bus bar 230. The primary power bus 242 and secondary bus members 244 are mechanically coupled and electrically connected at bus bar connection points 234 (shown covered by electrically insulating boots). To complete the electric circuit, load conductors 250 are electrically connected to corresponding circuit breaker load terminals (not shown) in a well known manner, and to the load 252 (shown in simplified form in FIG. 5). Specifically, the load conductors 250, which comprise power conductors 226, are electrically and mechanically connected by additional power bus bars 230 via bus bar connection points 234 to a current transformer assembly 229. The mechanical and electrical connections between the load 252, which is received at a corresponding terminal connection 236 proximate the current transformer assembly 229, are provided by the current transformer (CT) bushings 231, shown.

The housing 202 of switchgear cabinet 200, similar to housing 102 of switchgear cabinet 100, previously discussed with respect to FIG. 2, includes a number of dividers 246,247 (FIG. 3) (removed in FIG. 4 for simplicity of illustration) between the sections 216,218,220 of the housing 202, and a number of front covers 203,205 (FIG. 3) (removable cover 205 is only partially shown in FIG. 3) structured to removably cover the sections 216,218,220. More specifically, in the example of FIG. 3, the housing 202 includes a first divider 246 which extends from the top 208 to the bottom 210 of the cabinet housing 202 in order to separate and substantially isolate the third section 220 of the housing 202 from the first and second sections 216,218. A second divider 247 is disposed between the first and second sections 216,218 in order to separate and electrically isolate the first and second circuit breakers 222,224 disposed therein. It will, however, be appreciated that the sections 216,218,220 of housing 202 and the dividers 246,247 therefore, could be arranged in any known or suitable alternative configuration other than that illustrated in the example of FIG. 3. For example and without limitation, the first and second sections 216,218 and first and second circuit breakers 222,224 thereof could alternatively be disposed (not shown) at or about the second sidewall 214, with the third section 220 and the substantial portion 238 of the electrical bus assembly 225 disposed therein being disposed (not shown) between the first and second sections 216,218 and the first sidewall 212. Similarly, the first and second sections 216,218 could be reversed from the configurations shown in the example of FIG. 3, and could further be employed with one or more additional sections (e.g., without limitation, a fourth section) (not shown) in any suitable configuration.

It will also be appreciated that any known or suitable front cover(s) for the switchgear cabinet housing 202 and sections 216,218,220 thereof, other than the hinged covers or doors 203 for first and second sections 216,218 and the removable cover 205 (partially shown in FIG. 3) for the third section 220 in the example of FIG. 3, could be employed without departing from the scope of the invention.

Figure 6A:
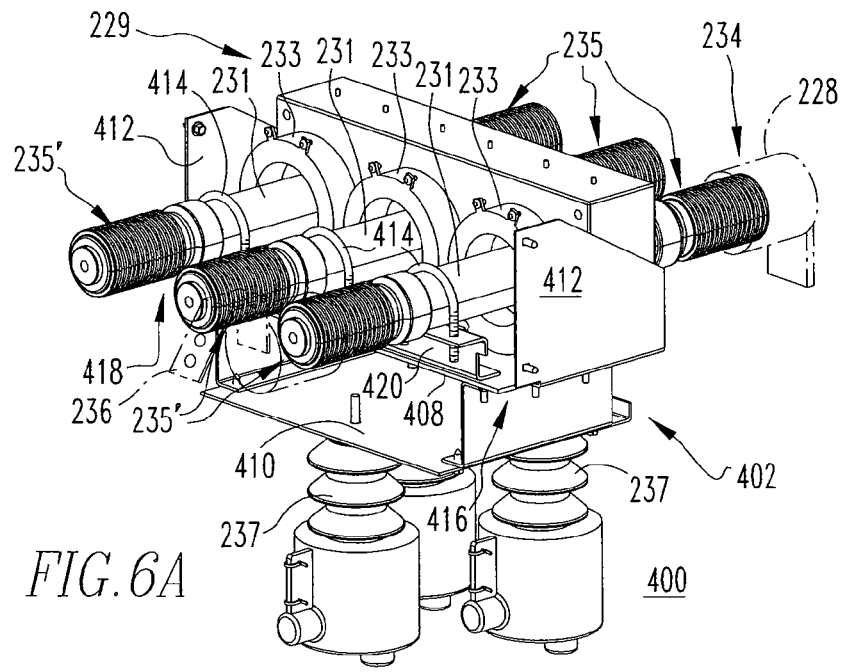
FIGS. 6A and 6B are isometric assembled and exploded views, respectively, of one of the mounting assemblies for the electrical bus member mounting system of FIG. 5.
Figure 6B:
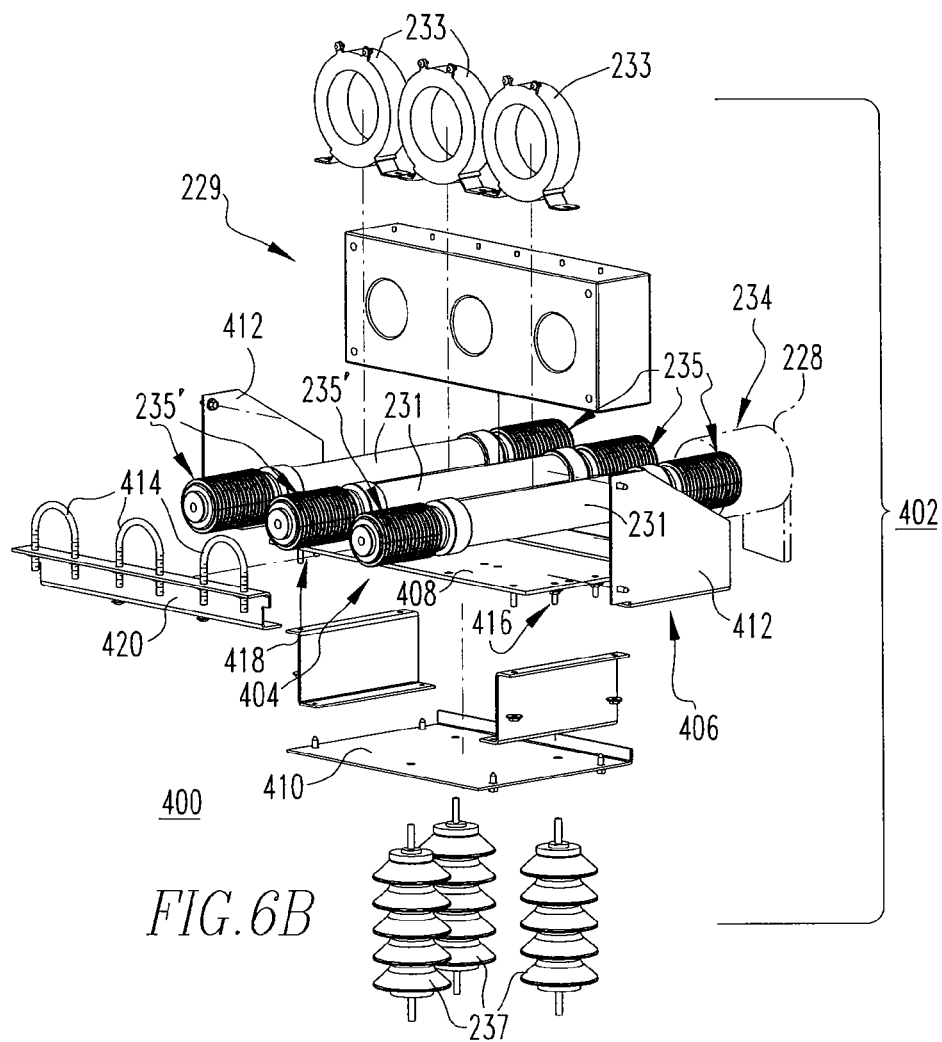

FIGS. 6A and 6B show the aforementioned electrical bus member mounting system 400 which is structured to consolidate the substantial portions 238 (FIGS. 3-5) of the electrical bus assembly 225 (FIGS. 3-5) at a single location within the switchgear cabinet housing 202 (FIGS. 3 and 4) to facilitate the substantially unobstructed front access thereto, as previously discussed. The electrical bus member mounting system 400 includes a number of mounting assemblies 402,402' (FIGS. 3-5) corresponding to the number of circuit breakers 222,224 (FIGS. 3 and 4) of the switchgear cabinet 200 (FIGS. 3 and 4). It will be appreciated that the electrical bus member mounting system 300 of switchgear cabinet 100 of FIG. 2, which has a single mounting assembly 302, is substantially identical to the mounting assembly 400 shown and described with respect to FIG. 6A and 6B, which has two mounting assemblies 402,402'. Like components of electrical bus member mounting system 300 are similarly numbered in FIG. 2 using 300 series reference numbers, whereas the equivalent components in electrical bus member mounting system 400 of FIGS. 6A and 6B are numbered using 400 series reference numbers. For simplicity of disclosure, only one mounting assembly 402 of electrical bus member mounting system 400 will be discussed, and the like components of the mounting assembly 302 of electrical bus member mounting system 300 of FIG. 2 will not be repetitively discussed.

As shown in FIGS. 6A and 6B, the mounting assembly 402 of the electrical bus member mounting system 400 includes a first portion 404 and a second portion 406. The electrical bus members 226,228,230,232,234,236, previously discussed in connection with FIGS. 3-5, are coupled to the first portion 404 of the mounting assembly 402. The second portion 406 of the mounting assembly 402 is structured to be coupled at or about at least one of the sides 208,210,212,213,214 (see, for example, second portion 406 of mounting assemblies 402, 402' coupled to the first and second sidewalls 213,214 of third section 220 of switchgear cabinet housing 200 in FIG. 3; see also second portion 306 of mounting assembly 302 coupled to first and second opposing sidewalls 112,114 of switchgear cabinet housing 100 in FIG. 2).

As previously noted, the electrical bus members 226,228, 230,232,234,236 (best shown in FIG. 5) which are coupled to the first portion 404 of mounting assembly 402 comprise the substantial portion 238 (FIGS. 3-5) of the electrical bus assembly 225 (FIGS. 3-5). More specifically, as best shown in FIG. 5, the first portion 239, which comprises the substantial portion of the electrical bus assembly 225 for the first circuit breaker 222 (FIGS. 3 and 4), is mechanically coupled and electrically connected to the first portion 404 of first mounting assembly 402, and the second portion 241, which comprises the substantial portion of the electrical bus assembly 225 for the second circuit breaker 224 (FIGS. 3 and 4), is mechanically coupled and electrically connected to the first portion 404 of mounting assembly 402', which is substantially identical. In this manner, not only is access improved to the substantial portion 238 (including first portion 239 and second portion 241) of the electrical bus assembly 225 which preferably must be periodically inspected, but the actual process of inspection, repair, and/or maintenance of the substantial portion 238 is simplified with respect to the prior art (e.g., electrical enclosure 2 of FIGS. 1A and 1B) by consolidating it at one single location (e.g., without limitation, third section 220 of housing 202). Customers can also readily access terminal connections 236, for example, to connect cables 252 (partially shown in FIG. 5).

The first portion 404 of the example mounting assembly 402 comprises at least one supporting element, such as the primary and secondary mounting plates 408,410 shown, and the second portion 406 comprises at least one mounting element, such as the pair of mounting brackets 412, shown. The mounting brackets 412 are coupled to the first and second ends 416,418 of the primary mounting plate 408, in order to secure the mounting assembly 402 and substantial portion 238 (FIGS. 3-5) of the electrical bus assembly 225 (FIGS. 3-5) electrically connected thereto within the third section 220 (FIGS. 3 and 4) of the switchgear cabinet housing 202 (FIGS. 3 and 4). It will, however, be appreciated that any suitable supporting element (e.g., 408,410) and mounting element (e.g., 412) configuration other than the mounting plate 408,410, mounting bracket 412 combination shown and described herein, could be employed without departing from the scope of the invention.

As previously discussed, the electrical bus members 226, 228,230,232, 234,236 (FIGS. 3-5) include at least one of a power conductor 226, a conductor 228 which carries or transfers voltage, current or power, a power bus bar 230, a ground conductor 232 (FIGS. 3 and 4), a bus bar connection point 234, a terminal connection 236, and a power conductor structured to receive a surge arrestor device 237 (FIGS. 3 and 4). In the example of FIGS. 6A and 6B, one of the conductors 228 which carries or transfers voltage, current, or power is shown in phantom line drawing in simplified form. This conductor 228 cooperates with the aforementioned current transformer assembly 229 which includes a plurality of the current transformer (CT) bushings 231, previously discussed, and a plurality of current sensors 233. Each of the CT bushings 231 generally extends from the current transformer assembly 229 through a corresponding one of the current sensors 233, as shown. The current transformer assembly 229 is supported by the aforementioned primary mounting plate 408. For example, the current transformer assembly 229 of FIGS. 6A and 6B is coupled to the primary mounting plate 408 using a plurality of fasteners, such as the threaded U-bolts 414, shown, each of which partially surrounds a corresponding one of the CT bushings 231 and threadingly engages a support bracket 420. The support bracket 420, in turn, is coupled to the primary mounting plate 408. It will, however, be appreciated that any known or suitable fastening mechanism could be alternatively employed to support and secure the current transformer assembly 229 of the mounting assembly 402 without departing from the scope of the invention. Additionally, it will be appreciated that the supporting element (e.g., primary mounting plate 408) can further support additional electrical bus members such as, for example and without limitation, the power conductors structured to receive surge arrestors 237 shown in the example of FIGS. 6A and 6B. Specifically, three surge arrestors 237 are coupled to and supported by a secondary mounting plate 410, which is in turn coupled to the example primary mounting plate 408.

Each of the CT bushings 231 has a first end 235 and a second end 235'. The first end 235 comprises one of the aforementioned bus bar connection points 234 electrically connected to at least one of the aforementioned power conductor 226 (not shown), the power bus bar 230 (not shown), or the conductor 228 which carries or transfers voltage, current, or power (shown in phantom line drawing in simplified form). The second end 235' of the CT bushing 231 is electrically connected to one of the aforementioned terminal connections 236 (one terminal connection 236 is shown in simplified form in phantom line drawing in FIG. 6A). Thus, as best shown in FIGS. 3 and 5, the load 252 (see, for example, load conductor or cable 252 partially shown in FIG. 5) is connected to a corresponding one of the terminal connections 236 of the mounting assembly (e.g., mounting assembly 402) and is readily accessible, along with the substantial portion 238 of the electrical bus assembly 225 at a single location (e.g., without limitation, third section 220) of the switchgear cabinet housing 202.

Accordingly, embodiments of the invention provide electrical enclosures 100,200 which are smaller in size in comparison with comparable known prior art designs (e.g., cabinet 2 of FIGS. 1A and 1B) and wherein a substantial portion 138,238 of the electrical bus assembly 125,225 for electrical apparatus housed by the enclosure 100,200 and, in particular the portion of the electrical bus assembly 125,225 which is subject to the periodic inspection, is consolidated by the electrical bus mounting system 300,400 within a common section of the enclosure 100,200. Therefore, substantially unobstructed front access is provided to the substantial portion 138,238 of the electrical bus assembly 125,225 in order to facilitate such inspection, as well as repair and maintenance, and the connection of customer cables (e.g., 252). Such unobstructed front access also advantageously eliminates the requirement for the electrical enclosure 100,200 to be substantially spaced away from other structures (e.g., without limitation, a building wall; another piece of electrical equipment) because it substantially eliminates the requirement that access be provided to the electrical bus assembly 125,225 through the back or sides of the electrical enclosure 100,200.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical enclosure comprising:
a housing having a front, a back, a plurality of sides, and a plurality of sections disposed between said sides;
at least one electrical apparatus disposed within a first section of said housing;
a plurality of electrical bus members electrically connected to said at least One electrical apparatus, a substantial portion of said electrical bus members being collectively disposed within a second section of said housing;
at least one current transformer assembly electrically connected to a number of said electrical bus members within said second section of said housing;
wherein said at least one current transformer assembly and said substantial portion of said electrical bus members are accessible from the front of said housing, regardless of whether said at least one electrical apparatus is within or removed from said first section of said housing;

wherein the sides of said housing comprise a top, a bottom, and opposing first and second sidewalls; and wherein said at least one electrical apparatus composes a single switchgear apparatus; disposed between the opposing first and second sidewalls of said housing and between the top and the bottom of said housing; and wherein said second section and said substantial portion of said electrical bus members are disposed between one of the top of said housing and said first section, and the bottom of said housing and said first section.

2. The electrical enclosure of claim 1 wherein said single switchgear apparatus is a circuit breaker; wherein said substantial portion of said electrical bus members which are electrically connected to said circuit breaker are selected from the group consisting of power conductors, conductors which carry or transfer voltage, current or power, power bus bars, ground conductors, bus bar connection points, and terminal connections.

3. An electrical enclosure comprising:

a housing having a front, a back, a plurality of sides, and a plurality of sections disposed between said sides;

at least one electrical apparatus disposed within a first section of said housing;

a plurality of electrical bus members electrically connected to said at least one electrical apparatus, a substantial portion of said electrical bus members being collectively disposed within a second section of said housing;

at least one current transformer assembly electrically connected to a number of said electrical bus members within said second section of said housing;

wherein said at least one current transformer assembly and said substantial portion of said electrical bus members are accessible from the front of said housing, regardless of whether said at least one electrical apparatus is within or removed from said first section of said housing;

wherein the sides of said housing comprise a top, a bottom, and opposing first and second sidewalls;

a third section; wherein said third section is also accessible from the front of said housing; and wherein said at least one electrical apparatus comprises at least a first switchgear device and a second switchgear device; wherein said substantial portion of said electrical bus members includes at least a first portion of said electrical bus members being electrically connected to said first switchgear device and a second portion of said electrical bus members being electrically connected to said second switchgear device; wherein said first switchgear device is disposed within said first section of said housing; wherein said second switchgear device is disposed within said second section of said housing; wherein said at least one current transformer assembly comprises first end second current transformer assemblies; and wherein said first and second current transformer assemblies and said first and second portions of said electrical bus members are disposed within said third section of said housing.

4. The electrical enclosure of claim 3 wherein said first section of said housing and said first switchgear device disposed within said first section are disposed at or about one of the opposing first and second sidewalls of said housing and between the top and the bottom of said housing; wherein said second section of said housing and said second switchgear device disposed within said second section are disposed at or about said one of the opposing first and second sidewalls of said housing and between one of said first section and the top of said housing, and said first section and the bottom of said housing; and wherein said third section and said first and second portions of said electrical bye members disposed within said third section are disposed between the other one of the first and second opposing sidewalls of said housing and both said first section and said second section of said housing.

5. The electrical enclosure of claim 4 wherein said first portion of said electrical bus members comprises a substantial portion of said electrical bus members which are electrically connected to said first switchgear device; wherein said second portion of said electrical bus members comprises a substantial portion of said electrical bus members which are electrically connected to said second switchgear device; wherein said substantial portion of said electrical bus members which are electrically connected to said first switchgear device is generally disposed laterally adjacent said first switchgear device; and wherein said substantial portion of said electrical bus members which are electrically connected to said second switchgear device is generally disposed laterally adjacent said second switchgear device.

6. The electrical enclosure of claim 4 wherein said first switchgear device and said second switchgear device comprise a first circuit breaker and a second circuit breaker; wherein said first and second portions of said electrical bus members for said first circuit breaker and said second circuit breaker are selected from the group consisting of power conductors, conductors which carry or transfer voltage, current or power, power bus bars, ground conductors, bus bar connection points, and terminal connections.

* * * * *